United States Patent [19]

Small

[11] 4,359,912
[45] Nov. 23, 1982

[54] SUPERFLYWHEEL ENERGY STORAGE DEVICE

[75] Inventor: Thomas R. Small, Brookeville, Md.

[73] Assignee: The Johns Hopkins University, Baltimore, Md.

[21] Appl. No.: 34,160

[22] Filed: Apr. 27, 1979

[51] Int. Cl.$^3$ .................. F16C 13/00; F16C 15/00; F16F 15/30

[52] U.S. Cl. .................. 74/572; 29/159 R; 29/452; 29/458

[58] Field of Search .................. 74/572, 573 R, 573 F, 74/574; 29/159 R, 452, 458; 310/74, 153

[56] References Cited

U.S. PATENT DOCUMENTS

| | | | |
|---|---|---|---|
| 477,324 | 6/1892 | Coburn | 74/572 |
| 565,378 | 8/1896 | Cobb | 74/572 |
| 607,615 | 7/1898 | Chickering | 74/572 |
| 1,365,473 | 1/1921 | Emmet | 74/572 |
| 1,426,339 | 8/1922 | Sperry | 74/572 |
| 3,724,288 | 4/1973 | Jabukowski | 74/572 |
| 3,884,093 | 5/1975 | Rabenhorst | 74/572 |
| 3,964,341 | 6/1976 | Rabenhorst | 74/572 |
| 3,977,273 | 8/1976 | Ernst et al. | 74/572 |
| 4,036,080 | 7/1977 | Friedericy et al. | 74/572 |
| 4,123,949 | 11/1978 | Knight, Jr. et al. | 74/572 |
| 4,176,563 | 12/1979 | Younger | 74/572 |
| 4,183,259 | 1/1980 | Giovachini et al. | 74/572 |
| 4,207,778 | 6/1980 | Hatch | 74/572 |

Primary Examiner—Allan D. Herrmann
Assistant Examiner—Moshe I. Cohen
Attorney, Agent, or Firm—Robert E. Archibald; Samuel L. Sachs

[57] ABSTRACT

An inertial energy storage rotor device or superflywheel having a hub means affixed to a rim means by a plurality of spokes formed from a single filament which is wrapped partially around the rim means and alternately engages the upper and lower surfaces of the hub means to join the spokes. In one embodiment, the hub is secured by a single filament wound into a plurality of spokes to a ring means about which a rim means is wound. The ring means is secured to the rim means of this embodiment at a plurality of discrete locations about the circumference thereof.

31 Claims, 16 Drawing Figures

SUPERFLYWHEEL ENERGY STORAGE DEVICE

STATEMENT OF GOVERNMENTAL INTEREST

The invention herein described was made in the course of or under a contract or subcontract thereunder, with the Department of the Navy.

BACKGROUND AND/OR ENVIRONMENT OF THE INVENTION

1. Field of the Invention

The present invention relates to inertial energy storage devices, and more particularly to a superflywheel energy storage device which is capable of compensating for the many destructive forces generated by rotation of the flywheel at high speeds.

2. Description of the Contemporary and/or Prior Art

The storage energy density of flywheel structures has been greatly increased during the last decade through the employment of filamentary materials, the use of which has permitted various previously unknown designs. These anisotropic and isotropic filamentary materials such as carbon, fiberglass, Metglas, or a DuPont fiber known as Kevlar, all have strength to density properties significantly greater than that of steel. As a result, useful storage energy density levels, which are obtainable by winding these anisotropic materials into flywheel rims, far exceed storage energy density levels of previously configured flywheels.

Flywheel rims constructed of windings of anisotropic materials are most efficient if the mass of the hub and connection between the hub and the rim is reduced to a minimum with the bulk of the mass of the flywheel being located at the rim. As these wound rim flywheels are spun to higher and higher speeds to increase energy storage, the tensile strength of the means employed to connect the wound rim to a hub is eventually exceeded and flywheel failure immediately follows. In an attempt to most effectively mount a flywheel rim to a hub, various spokes or other mountings have been suggested both in the prior art and as parallel developments to the present invention. The present invention affords significant improvements over configurations presently known and also provides for a simply constructed structure which does not require elaborate, expensive, or complicated fabrication techniques and methods.

The problem of expansion of a wound filament rotor rim of a flywheel has been recognized in U.S. Pat. Nos. 1,365,473 issued to W. L. R. Emmet on Jan. 11, 1921 and 1,426,339 issued to E. A. Sperry on Aug. 15, 1922. Both of these patents teach mechanisms which provide for moderate expansion between spoke structures that are fixedly secured to flywheel hubs and the flywheel rim. These apparatuses teach movable joints between the spoke means and the rims thereof that engage the entire circumference of the inner portion of the rims to permit a minimal degree of expansion of the rim without failure of the spoke means. While such joints may have been adequate for low energy storage flywheels at slow rotational speeds, these structures are wholly inadequate for use with high energy level storage rims which store energy at high rotational speeds. In fact, these inventions were designed for use with wound metal rims which are well known in the art as having energy storage levels which in no way approach those of anisotropic filamentary materials which are wound into flywheel rims.

U.S. Pat. No. 3,724,288 issued to M. Jabukowski on Apr. 3, 1973 shows a high energy storage flywheel which is very similar in appearance to a bicycle wheel. A rim which includes a form having a substantially U-shaped cross section is provided and an anisotropic material is wound circumferentially within the substantially U-shaped area. The form is then attached to a hub by a plurality of discrete spokes with each of the spokes being secured on one end thereof to the form by bicycle-wheel type sleeve nuts with the other end of the spokes being secured to apertures in the hub. No means are shown or suggested for constraining the winding within the U-shaped area of the form and if this structure were spun at the speeds contemplated by the present invention, failure of the rim either by breaking or cracking of the sleeve nuts and/or separation of the winding from the form would occur at rather low energy storage levels. Some degree of axial stability is provided by extension of the discrete spokes from the outer surfaces of the hub to the central portion of the form around the circumference thereof. The present invention avoids the use of discrete spokes and connectors which are inherently weaker than a continuous spoke winding and provides for a greater degree of axial stability by having spokes crossing from one surface of a hub to the opposed surface of a rim without terminating midway between the surfaces of the rim as taught by Jabukowski.

U.S. Pat. No. 3,964,341 issued to D. W. Rabenhorst on June 22, 1976, teaches a rotary energy storage device which teaches multi-ring and discrete ring filament rotor windings. These windings are secured in various manners to a hub. This is primarily accomplished by radial wraps which are secured to a spoke-like member and extend around the peripheral edge of the flywheel winding.

U.S. Pat. No. 4,036,080 issued to J. A. Friedericy et al on July 19, 1977 discloses a multi-rim flywheel which comprises a plurality of discrete rings which are mounted on a spoke member in a subcircular fashion. Because of the subcircularity of the ring members, the rings are maintained through friction on the hub which includes a plurality of spiders. This structure relies closely on matching and interrelating the circumferences of the rings to supply the proper frictional engagement. Each of the rings engages adjacent rings along the entire adjacent circumferential surfaces thereof and therefore the forces generated upon rotation of the flywheel are not directed through a desired path as taught by the present invention.

The advantages of using a single filament for forming spoke means for affixing a flywheel rim to a hub has been recognized in U.S. Pat. No. 3,977,273 issued to A. O. G. Ernst et al on Aug. 31, 1976. Ernst proposes a flywheel which comprises a hub and a rim wherein a filament is wrapped around the exterior of the rim and around the hub in a repeating pattern so that a fabric is woven into a sheet which covers the entire outer surfaces of the rim and encloses the same therein. Therefore, this sheet essentially forms a solid tapered shell. Since the filament winding of the shell is constantly wound upon itself adjacent to the hub, the area adjacent the hub becomes prohibitively thick and places mass in an inefficient position adjacent to the hub. The shell goes around the entire outside of the rim, and therefore the rim bears directly upon and is constrained by the shell, severely limiting necessary radial expansion of the circumferential fibers of the rim. Aside from the foregoing limitations of Ernst, axial stability is minimal since shifting of the rim relative to the hub is only controlled by contact between the outer surface of the rim and the inner surface of the sheet.

U.S. Pat. No. 4,123,949 issued to Knight Jr. et al on Nov. 7, 1978 teaches an inertial energy storage device wherein a circumferentially wound resin impregnated filament material is employed to form a flywheel rim. The flywheel rim is secured to a hub by a plurality of discrete filament band sets which wrap around the outer surface of the rim and engage the outer surface of the hub. The outer surface of the hub provides a plurality of protrusions for capturing portions of the band sets. These band sets are taught to be wound with a uniform stress so that they can accommodate the allegedly uniform stress created by the rim during acceleration and deceleration of the flywheel. Unfortunately, the premise that uniform stress will be provided is not sound unless meticulous balancing and forming of the rim is undertaken. This balancing is both time-consuming and costly. In addition, the protrusions on the hub may well look like knife edges at high rotational speeds and can possibly cause failure of the band sets which will cause failure of the entire flywheel. Axial stability is not provided for except to the degree that the band sets can stabilize the rim through their outer wrapping about the hub. In addition, since the band sets which serve as spokes contact the outer surfaces of the rim, all the forces at these locations which want to break the rim during rotation are concentrated directly on the band sets. The crisscross windings of the filament of the present invention forming the spokes thereof provide greater axial stability than the band sets of Knight. In addition, the configuration of the present invention, which employs an inner ring and an outer rim, fixedly secured together at discrete locations, more advantageously distributes the load created by the rotating rim than the band sets of Knight.

The present invention overcomes the shortcomings associated with the prior art and other contemporarily developed flywheels by providing a flywheel which does not suffer from axial instability, does not require overly precise manufacture, and which transfers the stresses from the rim thereof to the hub thereof through spoke means over a more advantageous path than has been suggested in the previously discussed references.

SUMMARY OF THE INVENTION

Therefore, a primary object of the present invention is to provide an inertial energy storage rotor device which has a usable energy storage level far in excess of any known configuration.

A further object of the present invention is to provide an inertial energy storage rotor device which optimizes the path through which stress is transferred from the rim thereof to the hub thereof.

A still further object of the present invention is to provide an inertial energy storage rotor device wherein the spoke means thereof is formed from a single filament winding.

Still another object of the present invention is to provide an inertial energy storage rotor device wherein the spoke means thereof can accommodate nonuniform rim expansion without premature failure.

Still another further object of the present invention is to provide an inertial energy storage rotor device which can be fabricated without overly precise and extremely costly fabrication techniques heretofore required.

Another further object of the present invention is to provide an inertial energy storage rotor device which has extremely favorable axial stability characteristics both during rotation and at rest.

Another still further object of the present invention is to provide an inertial energy storage rotor device wherein the rim means thereof is not directly constrained by the spoke means thereof.

Another further object of the present invention is to provide a method for producing flywheels having the above-noted advantages.

A still further object of the present invention is to provide a form suited for aiding in the construction of a flywheel having the above-noted characteristics.

A still further object of the present invention is to provide an apparatus for facilitating the winding of a filament on a bandlike form for producing a flywheel rim.

A further object of the present invention is to provide an inertial energy storage rotor device and form for constructing the same which are both simple in design, inexpensive to manufacture, rugged in construction, easy to use, and are efficient in operation.

These objects, as well as further objects and advantages of the present invention will become readily apparent after reading the ensuing description of the non-limiting illustrative embodiments and examining the accompanying drawing.

An inertial energy storage rotor device, according to the principles of the present invention comprises, in one embodiment thereof, a hub means for attachment to a shaft, rim means, the hub means being disposed within the area defined by the rim means with the upper and lower edge portions of the hub means and the rim means being adjacent to each other, spoke means for mounting the rim means to the hub means, the spoke means comprising a single length of filament which is wrapped partially around the rim means at a first plurality of locations about the rim, with the filament passing from each of the locations to another location and over a portion of the hub means in between these locations in a repetitive fashion forming a plurality of spoke portions, each of the spoke portions contacting the upper edge of the rim means at one of the locations and also contacting the upper edge of the rim means at another of the locations and the lower edge of the hub means therebetween, each of the spoke portions contacting the lower edge of the rim means at one of the locations also contacting the lower edge of the rim means at another of the locations and the upper edge of the hub means therebetween, these locations being spaced apart and sufficient in number so as to permit trapping of the hub means between the spokes. The term single length of filament as used herein encompasses mono-filament material as well as filamentary material of the multi-stranded or bundle type.

Another embodiment of the present invention incorporating the principles thereof therein provides a substantially rigid ring means, hub means for attachment to a shaft, spoke means for mounting the ring means to the hub means, rim means concentrically disposed about the ring means, and means for securing the rim means to the ring means only at discrete preselected locations about the circumference thereof.

The flywheel winding form of the present invention provides a pair of upper and lower platforms which are connected together by a plurality of elongated supports, each affixed on one end thereof to the upper platform and on the other end thereof to the lower platform with the supports being arranged in a geometric fashion so as to define an area, and an elongated center support for positioning a flywheel hub means at a location within the area defined by the supports with the supports being arranged to support a ring-like portion or rim of a flywheel.

The apparatus for facilitating the winding of a filament on a band-like form in accordance with the principles of the present invention includes first and second plates both having a diameter larger than that of the form with each of the plates having a plurality of apertures disposed therethrough so that positioning of the plates on opposite sides of the form places the apertures adjacent to the outer surface of the form, and means for clamping the form between the first and second plates.

The present invention also teaches a method for employing the above-noted flywheel winding form and apparatus for facilitating the winding of a filament on a band-like form for forming and manufacturing the aforedescribed flywheel embodiments.

BRIEF DESCRIPTION OF THE DRAWING

In order that the present invention may be more fully understood, it will now be described, by way of example, with reference to the accompanying drawing in which.

DESCRIPTION OF THE PREFERRED EMBODIMENTS

Figure 1:
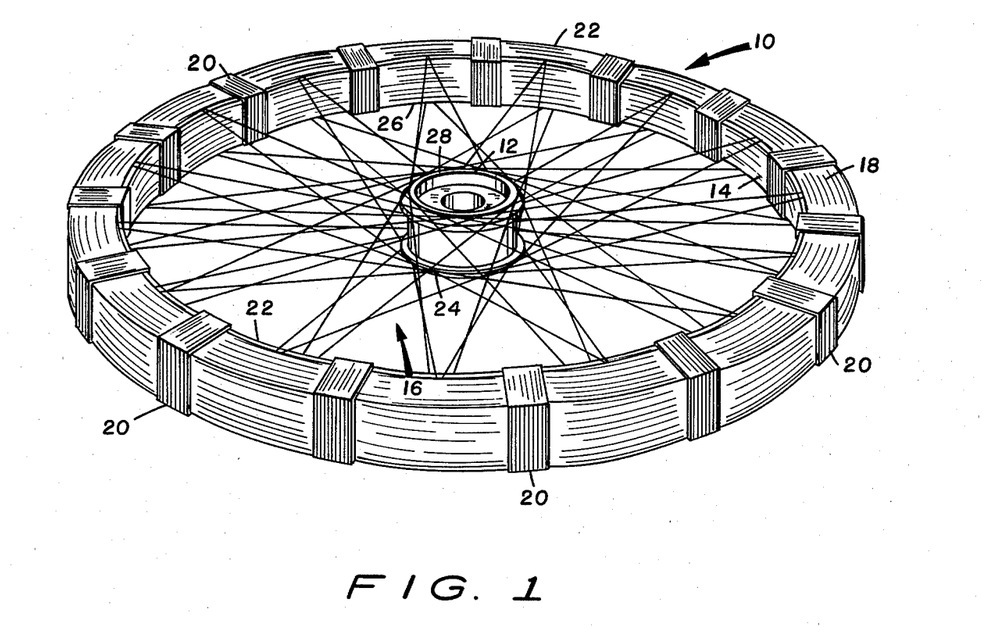
FIG. 1 is a perspective view of a superflywheel construction employing the teachings of the present invention.

Referring now to the figures, and more particularly to FIG. 1 thereof, there is illustrated therein a superflywheel 10 incorporating the principles of the present invention therein. The flywheel 10 comprises a hub 12 for mounting on a shaft not illustrated, a ring 14 which is secured to the hub 12 by spokes 16 and a rim 18 wound on the ring 14 and secured thereto by a plurality of radial wraps 20. The mass of the flywheel 10 has been concentrated in the rim 18 thereof to maximize energy storage efficiency. Construction of test models embodying the teachings of the flywheel 10 illustrated in FIG. 1 have shown that it is practical to construct a flywheel where 98 percent of the mass thereof is concentrated in the rim 18 and ring 14 with only two percent of the mass being accounted for by the hub 12 and spokes 16. As a result, energy storage to weight ratio is optimized.

Figure 2:
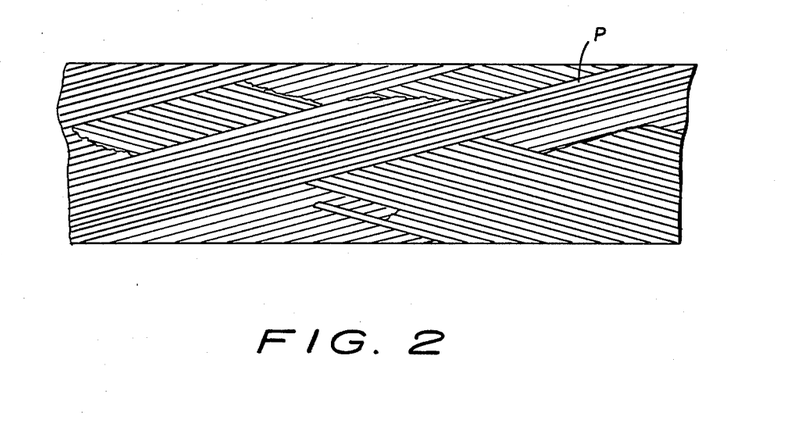
FIG. 2 is an enlarged fragmentary partially broken away view of the rim of the flywheel of FIG. 1 showing the helical wind thereof.
Figure 3:
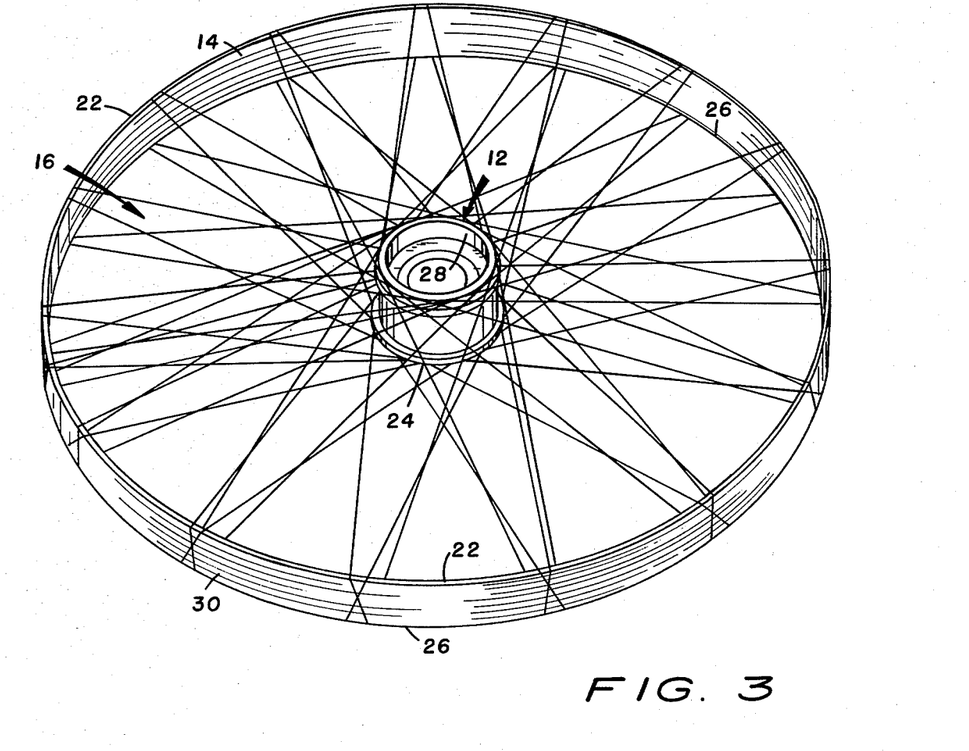
FIG. 3 is a perspective view from above of the ring and spokes of the flywheel of FIG. 1.
Figure 13:
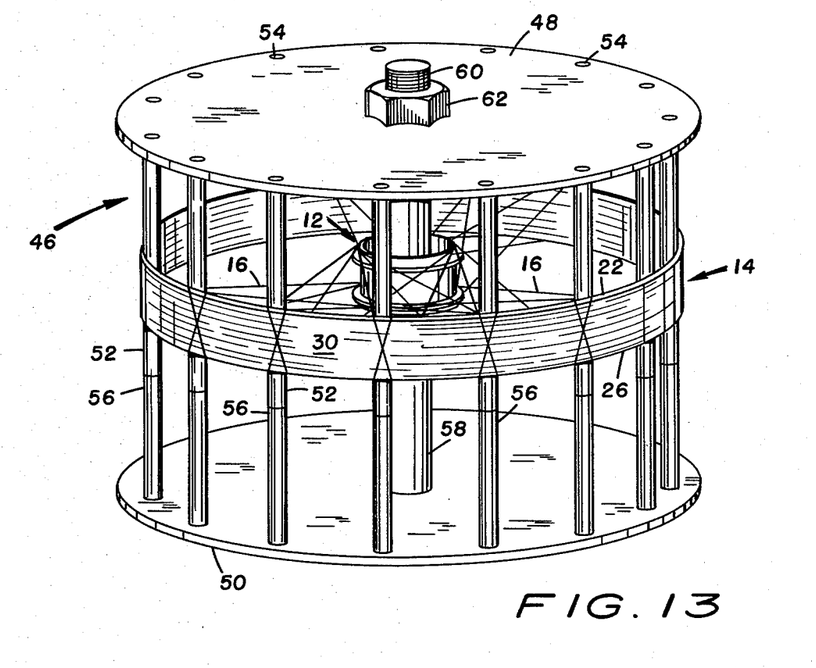
FIG. 13 is a perspective view of the form of the present invention.

The ring 14, which is also illustrated in FIGS. 3 and 13, comprises a helically wound filament which is embedded in a matrix material. The filamentary material, which is preferably anisotropic, is wound on a suitable form in a helical manner with the filament being at a slight angle to the plane normal to the periphery of the form, with this angle being reversed each time that another layer of material is wound. This type of winding is illustrated in FIG. 2 wherein a portion P of such a winding has the layers thereof partially broken away. The angle between the windings of different layers can be any value which is established as being adequate to form a stable structure that does not require special supports. During the winding of this filament upon the aforementioned form, or subsequent to the winding, the anisotropic material is embedded in epoxy or the like forming a matrix that binds the filament sections together. As a result, the ring 14 is substantially rigid. The ring 14 is then mounted to the hub 12 by the spokes 16 as illustrated in FIG. 3. The spokes 16 are wound from a single length of a filamentary material, which is also preferably anisotropic. The term single length of filament as used herein encompasses mono-filament material as well as filamentary material of the multi-stranded or bundle type.

Figure 4:
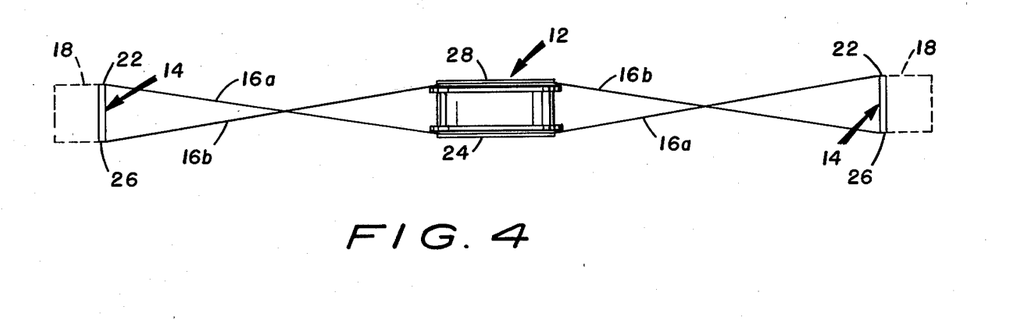
FIG. 4 is a schematic representation of the manner in which the filament which forms the spokes of the present invention engages the hub and ring of the present invention.
Figure 12:
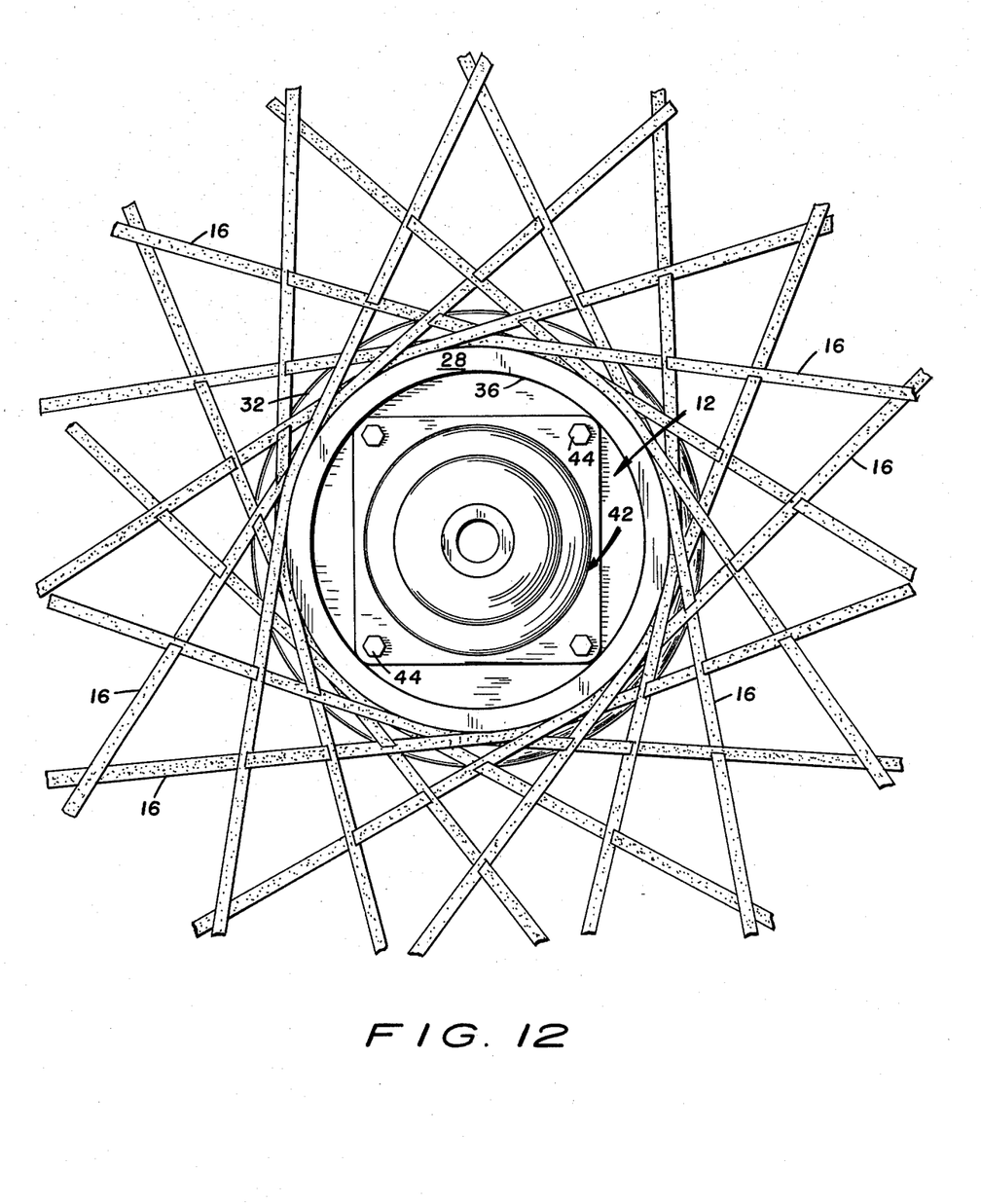
FIG. 12 is an enlarged fragmentary view of the central portion of the embodiment of FIG. 1.

The essential feature of the spokes 16 is that they are all wound from a single filament and that as they travel across the diameter of the ring 14 some of the spokes 16 shift from the upper edge 22 of the ring 14 to the lower edge 24 of the hub 12 and back to the upper edge 22 of the ring 14. Likewise, other of the spokes 16, as they cross the diameter of the ring 14, cross from the lower edge 26 of the ring 14 to the upper edge 28 of the hub 12 and back to the lower edge 26 of the ring 14. As a result, the spokes 16 cross each other in a plane disposed substantially midway between the upper and lower planes defined by the upper edges 22 and lower edges 26 of the ring 14. This relationship is illustrated schematically in FIG. 4 for two spokes 16a and 16b. Spoke 16a runs from the upper edge 22 of the ring 14 to the lower edge 24 of the hub 12 and back to the upper edge 22 of the ring 14. Similarly, but in a mirror-like reversal, the spoke 16b runs from the lower edge 26 of the ring 14 to the upper edge 28 of the hub 12 and back to the lower edge 26 of the ring 14. This pattern is repeated numerous times around the ring 14 to produce the structure illustrated in FIG. 3. The location where the spokes 16 touch the upper and lower edges 22 and 26 of the ring 14 are odd in number and are of a sufficient number so that the hub 12, hereinafter described, can be trapped and secured in position by the spokes 16 as illustrated in FIG. 12.

Figure 5:
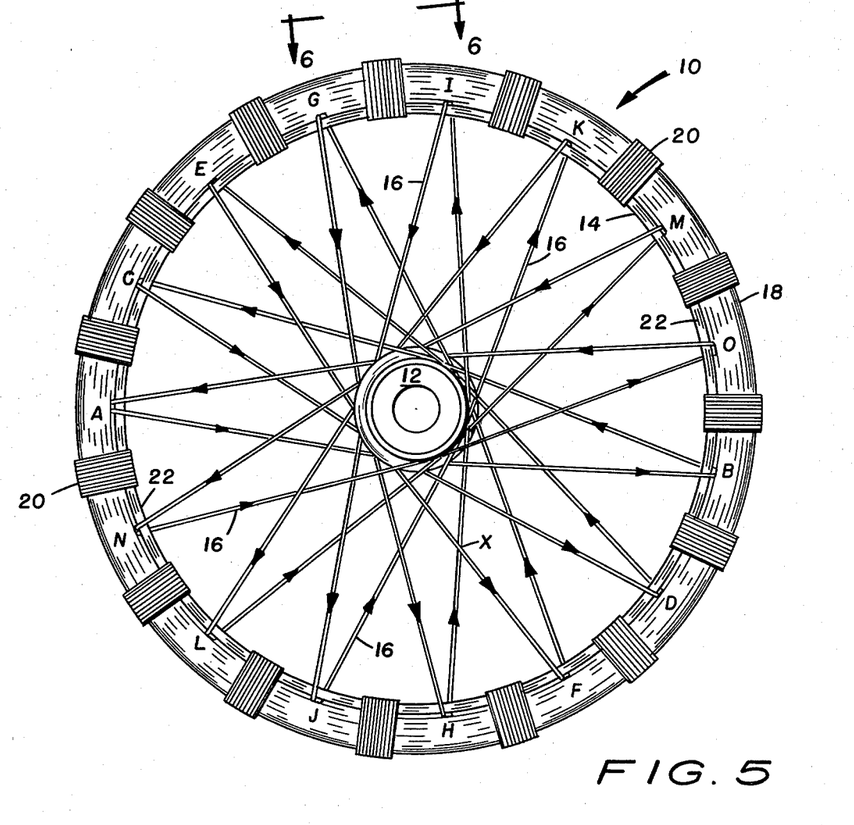
FIG. 5 is a schematic representation of the manner in which the single filament of the present invention is wound into a spoke.
Figures 6, 7, 8:
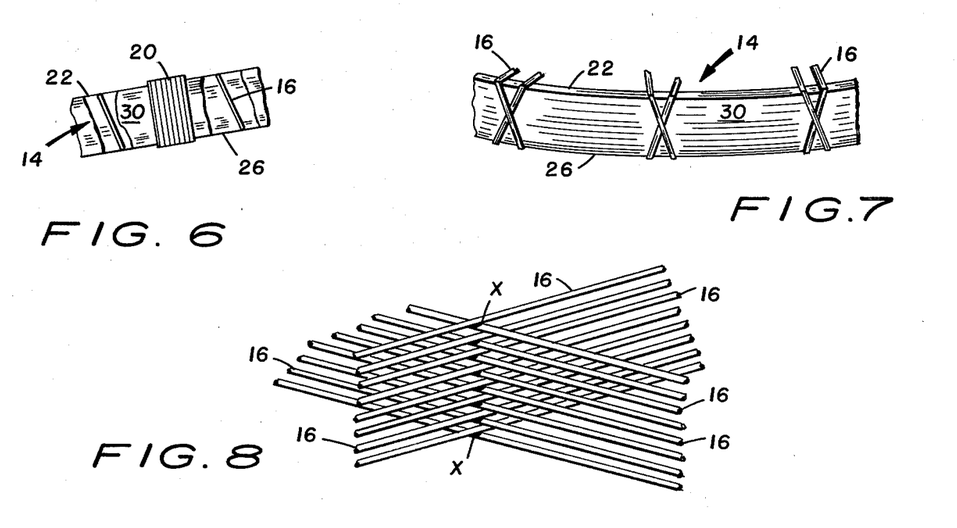
FIG. 6 is a fragmentary partially broken away view taken substantially from the lines 6—6 of FIG. 5.
FIG. 7 is a fragmentary view of the engagement between the outer surface of the rim and the spokes of the present invention.
FIG. 8 is an enlarged fragmentary pictorial representation of a portion of the intersection between two of the spokes of the flywheel of FIG. 1.

The pattern through which the filament which forms the spokes 16 travels when it is wound is a simple geometric pattern illustrated schematically in FIG. 5. FIG. 5 illustrates the hub 12, the ring 14, and the rim 18, along with the radial wraps 20 which secure the rim 18 to the ring 14. The circumference of the ring 14 is divided into a plurality of equal segments at locations labeled A through O. The filament which forms the spokes 16 is fixedly secured to the ring 14 at location A adjacent to the upper edge 22 thereof. The filament is then stretched across the diameter of the ring 14 toward a second location B forming a segment AB as illustrated by the arrows. The segment AB contacts the lower edge 24 of the hub 12 in between locations A and B and contacts the upper edge 22 of the ring 14 at A and B. The filament forming the spokes 16 is then wound around the outer surface 30 of the ring 14 and over the lower edge 26 thereof at a slight angle on the surface 30 as illustrated in FIG. 6. This places the filament adjacent to the lower edge 26 of the ring 14 at location B. The filament proceeds from location B to location C adjacent to the lower edge 26 of the ring 14 and in between B and C passes over the upper edge 28 of the hub 12 as shown by the arrows. The filament then passes over the outer surface 30 of the ring 14 back up to the upper edge 22 of the ring 14 at location C in the manner illustrated in FIG. 6. The filament continues from location C to location D and from location D to location E, etcetera, as illustrated by the arrows, all the way through to location O in the same manner as the filament passes from A to B and B to C thereby forming a first cycle of filament construction. When the filament reaches location O, it then travels back to location A adjacent to the upper edge 22 of the ring 14. The filament reaches location A and contacts the upper edge 22 of the ring 14 a fixed distance from the beginning of the filament. The filament then passes over the outer surface 30 of the ring 14 crossing over the portion of filament originally fixedly secured thereto and once again travels through a similar pattern from location A to B, B to C, C to D, etcetera forming a second cycle of filament construction as illustrated in FIGS. 1 and 3. Each time the filament travels around the outer surface 30 of the ring 14 it crosses over a previously wound portion of the filament which forms the spokes 16 as illustrated in FIGS. 3 and 7. As a result, the points where the filament contacts the upper edge 22 of the ring 14 are spaced equidistantly apart as are the points where the filament contacts the lower edge 26 of the ring 14.

After the filament completes its second cycle through locations A through O and back to A, the filament will reside at the exact point at location A where the filament began at the start of the first cycle. The filament once again travels through the first cycle as illustrated in FIG. 5 to create a second layer of filament coincident to the first layer of filament formed in the first cycle. After this first cycle is once again completed, the filament shifts into the second cycle and another second cycle is wound coincident with the previous second cycle already wound. As a result, the filament oscillates between the first and second cycles going through the geometric patterns previously described. As a result, examination of any point within the circumference of the ring 14 where the filament forming the spokes 16 cross will be interwoven as illustrated in FIG. 8. Such a point would occur at location X as illustrated in FIG. 5 which is illustrative of all the other areas where the filament crosses within the circumference of the ring 14 as illustrated in FIGS. 1 and 3.

The locations A through O are purposely odd in number so that the filament will shift from the first cycle to the second cycle as it is wound through the prescribed geometric pattern. The exact number of times that the filament will be wound through the first and second cycles depends on calculable considerations concerning the force that will be exerted on the spokes 16 and other considerations relating to the stress that the rim 18 will place, as a static load, on the spokes 16 when the superflywheel 10 is at rest.

As previously mentioned, the winding of the spokes 16 captures and retains therein the hub 12 as illustrated in FIGS. 1, 3, and 12. The capturing effect that the spokes 16 have on the hub 12 is a result of the construction of the hub as illustrated in FIGS. 9 and 10, and the engagement of the spokes 16 with the upper and lower edges 28 and 24 of the hub 12 as illustrated in FIGS. 11 and 12 wherein the spokes 16 are curved and slightly wrapped around the hub 12.

Figure 9:
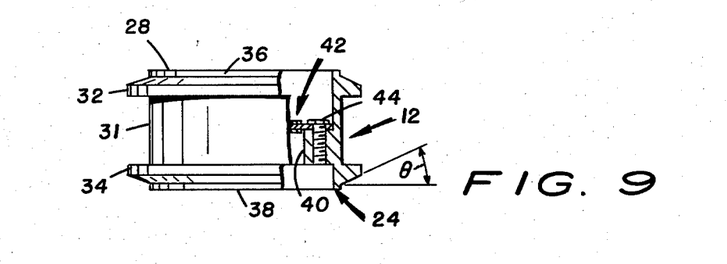
FIG. 9 is a partially broken away side view of the hub of the present invention.
Figure 10:
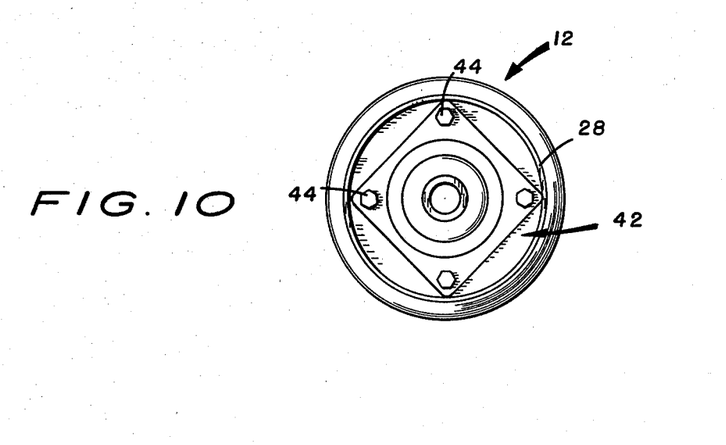
FIG. 10 is a top view of the hub of FIG. 9.

With reference to FIGS. 9 and 10, the hub 12 comprises a rigid cylinder 31, preferably machined from aluminum or the like which provides a pair of annular flanges 32 and 34 adjacent, respectively, to the upper and lower edges 28 and 24 of the hub 12. These flanges are not coextensive with the upper and lower edges 28 and 24 but rather are slightly offset therefrom to form lips 36 and 38. The flanges 32 and 34 are substantially parallel and extend about the diameter of the cylinder as illustrated. The flanges 32 and 34 are both beveled at a uniform preselected angle $\theta$ to coincide with the angle at which the spokes contact the annular flanges 32 and 34. The central portion of the hub 12 is hollow and an inwardly extending mounting portion 40 is formed by the interior walls of the hub 12. The mounting portion 40 serves to mount a suitable shaft engaging assembly 42 which is secured thereto by a plurality of bolts 44. The shaft engaging assembly 42 mounts the hub 12 to a shaft and may take one of many forms well known in the art including the soft gimbaling mounting which is illustrated.

Figure 11:
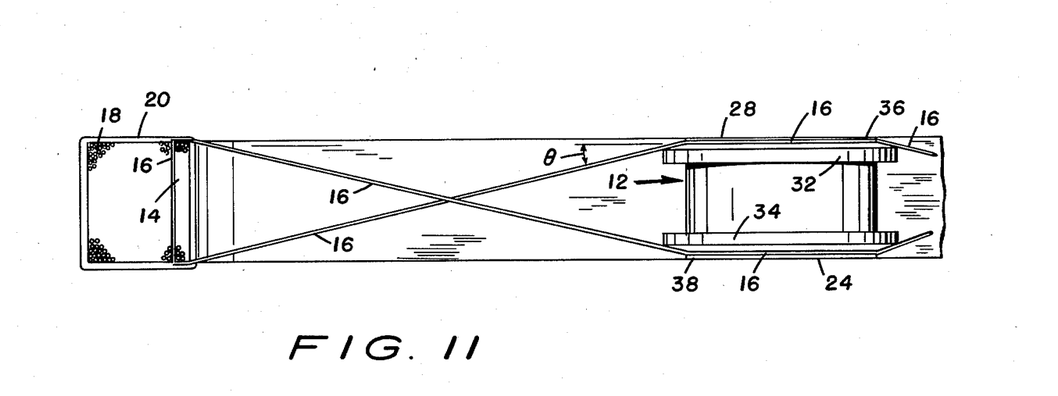
FIG. 11 is a partial cross sectional view of a portion of FIG. 1.

Referring to FIGS. 11 and 12, it can be seen that as the filament which forms the spokes 16 passes over and under the hub 12 contacting the upper and lower flanges 32 and 34 and the beveled surfaces thereof, the hub 12 is trapped within the spokes 16. This is a result of forces exerted in several directions on the hub 12 by the filament forming the spokes 16. Each one of the spokes 16 creates a force directed towards the center of the hub 12 as a result of the partial wrapping of the spokes 16 around the hub 12. These forces bear against the lips 36 and 38 and are balanced because of the symmetrical nature of the winding of the filament which forms the spokes 16. As a result, the spokes 16 retain the hub 12 in a position at the substantial center of the ring 14. In addition, as a result of the crossing of the spokes 16 as they travel from the upper edge 22 of the ring 14 to the lower edge 24 of the hub 12 and back to the upper edge 22 of the ring 14 as well as from the lower edge 26 of the ring 14 to the upper edge 28 of the ring 14 and back to the lower edge 26 of the ring 14, forces are created substantially parallel to the longitudinal axis of the hub 12 which centers the hub 12 between the planes defined by the upper and lower edges 22 and 26 of the ring 14.

In order for the hub 12 to be properly trapped by the spokes 16, an adequate number of locations must be specified for the contact between the spokes 16 and the ring 14. If an inadequate number of locations are selected, the hub 12 will not be adequately trapped by the spokes 16. If too many locations are selected for contact between the filament which forms the spokes 16 and the ring 14, an unnecessary number of spokes will be formed and the energy storage to weight ratio of the superflywheel 10 will be slightly impaired. Aside from the trapping of the hub 12 by the spokes 16 through the exertion of forces previously described which act through friction between the hub 12 and the spokes 16, a suitable adhesive or bonding agent such as epoxy can be employed to fix the spokes 16 to the flanges 32 and 34 of the hub 12. In addition, where the sections of the filament which forms the spokes 16 cross as at points X as illustrated in FIG. 8, these crosses can be bonded together with a suitable epoxy. Similarly, all of the filamentary material in the spokes can be bonded together, if desired, to preclude unraveling of certain types of filamentary materials.

Although a specific configuration for a hub has been described, it should be apparent to one skilled in the art that other hub configurations employing the essential features of the hub 12 as described can be used to properly mechanically interface with the spokes 16 so that an alternate hub can be effectively locked therebetween.

To facilitate the winding of the spokes 16 on the ring 14 in the configuration as illustrated in FIG. 3, the present invention contemplates the use of a form 46 as illustrated in FIG. 13. The form 46 comprises upper and lower platforms 48 and 50 which are spaced apart and are substantially parallel. A plurality of elongated supports 52 are each fixedly secured on the upper ends thereof to the upper platform 48 and on the lower ends thereof to the lower platform 50 and are arranged in a circular configuration so that the outer surfaces of the elongated supports 52 form a circle with a circumference approximately that of the inner circumference of the ring 14. The upper and lower ends of the elongated supports 52 are fixedly secured to the upper and lower platforms 48 and 50 by a plurality of screws 54. If desired, other suitable means can be employed instead of the screws 54. Each of the elongated supports 52 telescope and can be separated at 56. An elongated center support 58 is fixedly secured on the lower end thereof to the lower platform 50, and the upper end thereof extends through an aperture disposed in the upper platform 48. The end of the center support 58 which extends through the upper platform 48 is threaded at 60 and threadably cooperates with a nut 62. When the nut is tightened, the telescoping sections of the elongated supports 52 bottom out, and the upper and lower platforms 48 and 50 are stabilized at a preselected distance of separation. When the nut 62 is removed from the threaded portion 60 of the center support 58, the upper platform 48 can be moved relative to the lower platform 50 so that the elongated supports 52 telescope and are separated to permit placement of the ring 14 around the elongated supports 52. At the same time, the hub 12 can be placed on the center support 58 positioning the same through frictional engagement or the like, at the proper location relative to the ring 14 when the form 46 is reassembled as illustrated in FIG. 13.

When the form is assembled with the ring 14 and the hub 12 in position as hereinbefore described, the filament which is used to wind the spokes 16 can easily and quickly be wound around the hub 12 and the ring 14 as illustrated in FIGS. 1 through 8 and 11 and 12. This is preferably accomplished by the winding of a suitable length of filament on a bobbin. The bobbin can then be easily and quickly passed through the form 46 over and under the hub 12 and ring 14, over the outer surface 30 of the ring 14, and around the elongated supports 52 as illustrated. As a result of the passing of the filament around adjacent sides of the elongated supports 52, the proper separation between the sections of the filaments is maintained. When all the spokes 16 are wound, the nut 62 is backed off the threaded portion 60 of the center support 58, and the upper and lower platforms 48 and 50 are separated permitting removal of the assembly of the hub 12 and ring 14 which would then look like the structure illustrated in FIG. 3.

After the above procedure has been accomplished, the flywheel 10 is completed by the winding of the rim 18 onto the ring 14 and the placement of the radial wraps 20 to produce a structure as illustrated in FIG. 1. The winding of the rim 18 on the ring 14 is facilitated by the apparatus 64 illustrated in FIGS. 14 and 15. The apparatus 64 comprises a first plate 66 and a second plate 58 which are clamped together by a clamping assembly 70. The ring 14 and hub 12 which have been joined together by the spokes 16, as illustrated in FIG. 3, are placed between the first and second plates 66 and 68 and the clamp assembly 70, through the rotation of bolts 72, clamps the first and second plates 66 and 68 together to lock the hub 12 and rim 18 therebetween. The clamping assembly 70 merely provides mating portions on opposite sides of the first and second plates 66 and 68 so that the bolts 72 can cooperatively engage these portions to act as a clamp. If desired, other suitable clamping means can be employed. The clamping assembly 70, as illustrated, has an aperture 74 disposed therethrough for accommodating a shaft so that when the clamping assembly 70 is mounted on the shaft, rotation of the shaft will impart rotation to the first and second plates 66 and 68 simultaneously. The diameter of the first and second plates 66 and 68 is greater than the diameter of the ring 14 so that an overhanging lip 76 is formed on the first plate 66, and an overhanging lip 79 is formed by the second plate 68. These overhanging lips 76 and 79 serve as boundaries for the upper and lower edges 22 and 26 of the ring 14.

Figure 14:
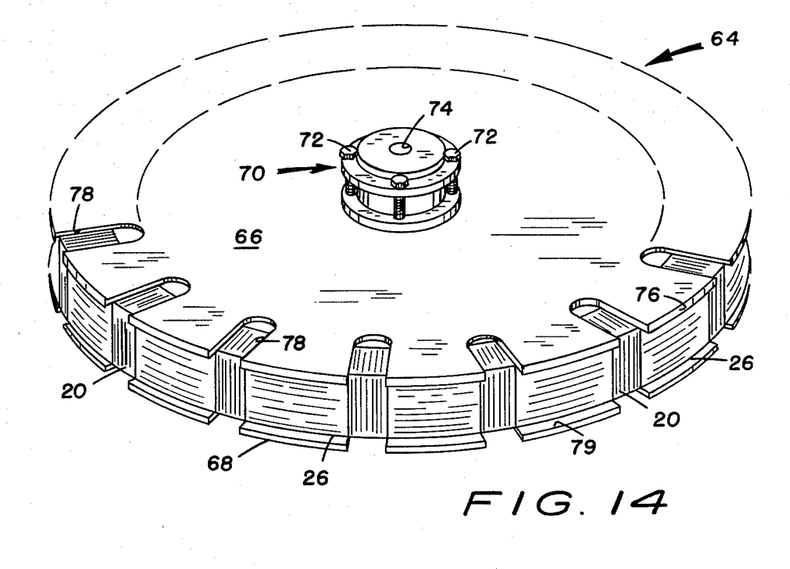
FIG. 14 is a perspective view of the apparatus for facilitating the winding of a filament on a form of the present invention.
Figure 15:
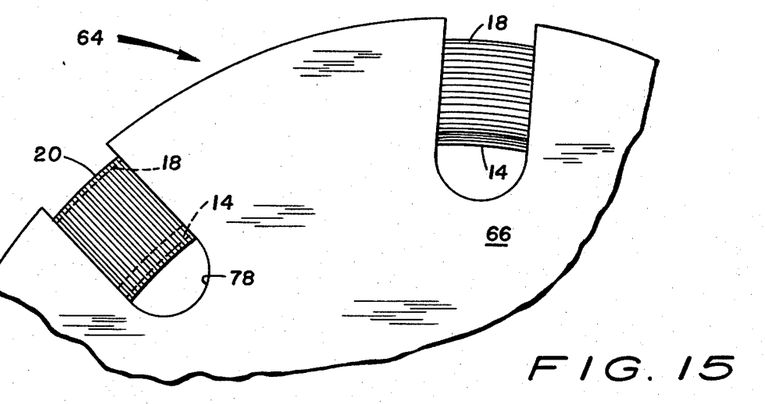
FIG. 15 is a fragmentary enlarged view of a portion of the apparatus of FIG. 14.

When the rim 18 is to be wound on the ring 14, a filament which is to comprise the rim 18 is fixedly secured to the ring 14 which is clamped between the first and second plates 66 and 68. The shaft which supports the clamping assembly 70 is then rotated as the filament is slowly shifted in a plane normal to the longitudinal axis of the shaft, thereby forming a helical stacked winding similar to that of the ring 14 as illustrated in FIG. 2. When the desired number of layers of filament have been wound on the ring 14, with the first and second plates 66 and 68 serving as side boundaries for this winding, the free end of the filament is fixedly secured to the other windings in a suitable manner, such as through the use of epoxy. The first and second plates 66 and 68 have a plurality of notches 78 disposed equidistantly around the circumference thereof. When the clamping assembly 70 clamps the first and second plates 66 and 68 together about the ring 14, the notches 78 align thereby permitting access to the inner and outer surfaces of the ring 14.

The rim 18 is secured to the ring 14 at a plurality of discrete locations which coincide with the aligned notches 78 by a plurality of discrete radially disposed helical stacked filamentary windings 20 which are each wound around the rim 18 and the ring 14 as illustrated in FIGS. 14 and 15. The windings 20 are helically formed in the same manner as the portion P of FIG. 2 is formed. The radial wraps 20 are preferably executed with a filamentary anisotropic material although other suitable materials can be employed. After the wraps 20 are placed around the ring 14 and the rim 18, they are bonded thereto by a suitable epoxy creating discrete connections between the ring 14 and the rim 18. It should be apparent that the area of the rim 18 between the wraps 20 is not fixedly secured to the ring 14 in any manner. The radial wraps 20 are disposed so they fall equidistant between the points at which the spokes 16 contact the ring as illustrated in FIG. 1. This presents several distinct advantages. For example, when the flywheel 10 is spun, the rim 18 will be subject to an outward force and the filament thereof will move and migrate in a well known manner. Once the filament seeks its force—balanced equilibrium location during rotation, an outward force from the rim 18 will be transferred to the spokes 16 through the radial wraps 20 and the ring 14. The distance that this force will have to travel from the radial wraps 20 to the points of contact between the spokes 16 and the ring 14 is increased by the fact that the rim 18 is not fixedly secured to the entire circumference of the rin 14. Therefore, the elasticity of the additional length of material through which this force is translated can be exploited to increase the amount of force that the flywheel 10 can sustain before failure. If desired, the plates 66 and 68 can be provided with differently configured and located notches and an alternate pattern of wraps 20 can be employed as desired by the user.

Although the present invention has been described where the rim 18 thereof is of the multi-ring continuous filament type, it is possible that a rim can be formed of other suitable materials such as a filamentary material embedded in a suitable matrix or a circular homogeneous mass. Alternately, the rim 18 can be wound without a helical wind if sufficient wraps 20 are employed. If the rim is constructed of a filamentary winding, it preferably has a higher Young's modulus than the filament which forms the spokes 16 so that the inevitable imbalances in the rim 18 upon rotation can be accommodated by greater stretching of the spokes 16 where necessary. As a result, the superflywheel 10 is essentially self-balancing without any severe limitation upon energy storage capabilities as a result of premature failure of the spokes.

Figure 16:
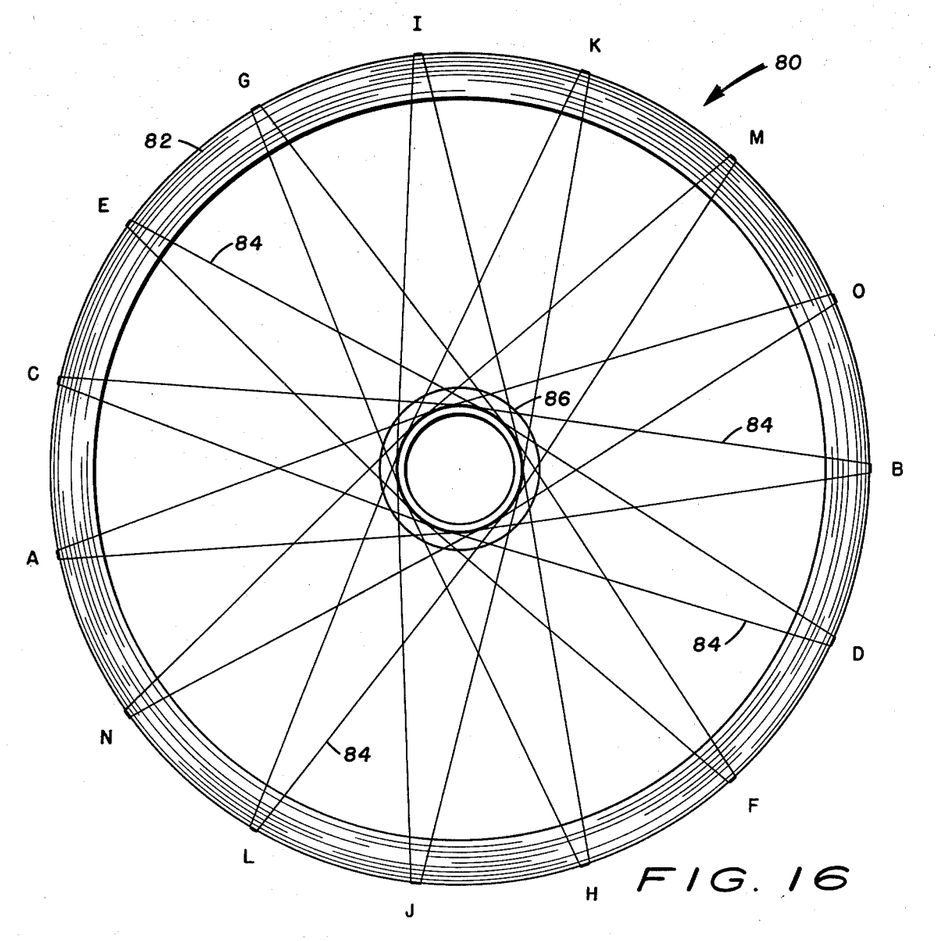
FIG. 16 is a top plan view of an alternate embodiment of the present invention.

With reference to FIG. 16, there is illustrated therein a superflywheel 80 which is constructed within the scope and the principles of the present invention. The superflywheel 80 is formed in exactly the same manner as the ring 14 and hub 12 illustrated in FIG. 3. The essential difference is that superflywheel 80 comprises a rim 82 which is substantially thicker in diameter than ring 14 of FIG. 1 and therefore the useful mass of the flywheel 80 is concentrated in the rim 82. Spokes 84 which are wound through locations A through O, affix the rim 82 to a suitable hub 86 in the same manner that the spokes 16 affix the ring 14 to the hub 12. This alternate configuration does not provide the advantage of discrete affixment of a rim to a ring as taught by superflywheel 10 of FIG. 1 but does have particular construction cost advantages for lower energy storage applications and can be readily fabricated using the form 46 of FIG. 13.

It should be apparent to one skilled in the art that the present invention provides a flywheel which is capable, when it is constructed of an anisotropic material such as DuPont Devlar or the like, of higher energy storage levels than have been previously known. A flywheel similar to that of FIG. 1 has been constructed and energy storage levels in excess of 90 watt hours per kilogram were demonstrated. This test flywheel had an outside diameter of 0.6 meters and an inside diameter which has 90 percent of the outside diameter or 0.54 meters. The axial length of the flywheel was 0.2 meters, and the maximum rotational speed sustained before failure was 29,110 rpm.

It will be understood that various changes in the details, materials, arrangement of parts and operational conditions, which have been herein described and illustrated in order to explain the nature of the invention, may be made by those skilled in the art within the principles and scope of the present invention.

Having thus set forth the nature of the invention, what is claimed is:

1. An inertial energy storage rotor device for rotation about an axis defined by a shaft comprising:
   hub means for attachment to said shaft, said hub means having upper and lower edge portions;
   rim means having upper and lower edge portions, said hub means being disposed within an area defined by said rim means;
   spoke means for mounting said rim means to said hub means, said spoke means comprising a single length of filament, said filament being wrapped partially around at least a portion of said rim means at a first plurality of locations around said rim, said filament passing from each of said locations to another said location and over a portion of said hub means in between said locations in a repetitive fashion forming a plurality of spoke portions, each of said spoke portions contacting said upper edge of said rim means at one of said locations also contacting said upper edge of said rim means at another one of said locations and said lower edge of said hub means therebetween, each of said spoke portions contacting said lower edge of said rim means at one of said locations also contacting said lower edge of said rim means at another of said locations and said upper edge of said hub means therebetween, said locations being spaced apart and sufficient in number so that said filament produces forces acting on said hub means for trapping of said hub means between said spokes; and
   means for fixedly securing the portions of said spokes contacting said hub means thereto.

2. An inertial energy storage rotor device in accordance with claim 1, wherein said rim means comprises a helically wound filament embedded in a matrix material.

3. An inertial energy storage rotor device in accordance with claim 1, wherein said filament comprises an anisotropic material.

4. An inertial energy storage rotor device in accordance with claim 1, wherein said rim means comprises a filamentary winding, the material forming said filamentary winding having a higher Young's modulus than the material forming said single filament of said spoke means.

5. An inertial energy storage rotor device in accordance with claim 1, wherein said securing means comprises said hub providing a plurality of surfaces for frictionally engaging said spokes.

6. An inertial energy storage rotor device in accordance with claim 5, further comprising adhesive means for securing said spokes to said plurality of surfaces.

7. An inertial energy storage rotor device in accordance with claim 1, wherein said locations are equally spaced around said rim means and are odd in number.

8. An inertial energy storage rotor device in accordance with claim 7, wherein the wrapping of said spoke filament around said rim means and the passing thereof over said hub means through each of said locations of said first plurality comprises a winding cycle, at the end of said winding cycle through each of said locations said spoke filament being wrapped about said rim means and over said hub means in an alternate winding cycle having a second plurality of locations displaced symmetrically a fixed distance from said first plurality of locations.

9. An inertial energy storage rotor device in accordance with claim 8, wherein during said mounting of said rim means to said hub means said spoke filament oscillates between said first winding cycle and said second winding cycle, completion of one of said winding cycles causing a shift to the other of said winding cycles as a result of said locations being odd in number.

10. An inertial energy storage rotor device in accordance with claim 9, wherein the portions of said spoke filament within said second winding cycles cross over portions of said filaments in said first winding cycles at the outer surface of said ring means and between adjacent locations of said first and second pluralities of locations.

11. An inertial energy storage rotor device in accordance with claim 10, wherein said spoke filament is fixedly secured to said rim means by a suitable adhesive.

12. An inertial energy storage rotor device for rotation about an axis defined by a shaft comprising:
substantially rigid ring means comprising a helically wound filament embedded in a matrix material;
hub means for attachment to said shaft;
spoke means for mounting said ring means to said hub means;
rim means concentrically disposed about said ring means; and
means for securing said rim means to said ring means only at discrete preselected locations about the circumference thereof, said securing means being independent of said spoke means.

13. An inertial energy storage rotor device in accordance with claim 12, wherein said filament is anisotropic and said matrix material comprises a suitable epoxy.

14. An inertial energy storage rotor device for rotation about an axis defined by a shaft comprising:
substantially rigid ring means;
hub means for attachment to said shaft;
spoke means for mounting said ring means to said hub means;
rim means comprising a filamentary winding about the circumference of said ring means and which is concentrically disposed about said ring means; and
means for securing said rim means to said ring means only at discrete preselected locations about the circumference thereof, said securing means being independent of said spoke means.

15. An inertial energy storage rotor device in accordance with claim 14, wherein said filamentary winding is wound in helical stacked layers.

16. An inertial energy storage rotor device in accordance with claim 15, wherein said filamentary winding comprises an anistropic material.

17. An inertial energy storage rotor device for rotation about an axis defined by a shaft comprising;
substantially rigid ring means;
hub means for attachment to said shaft;
spoke means comprising a single length filament wrapped partially around said ring means and over said hub means at a plurality of locations on said hub means and said ring means, said spoke means mounting said hub means at the substantial center of said ring means;
rim means concentrically disposed about said ring means; and
means for securing said rim means to said ring means only at discrete preselected locations about the circumference thereof, said securing means being independent of said spoke means.

18. An inertial energy storage rotor device in accordance with claim 17 further comprising adhesive means for fixedly securing said spoke means to said ring means and said hub means.

19. An inertial storage rotor device in accordance with claim 17, wherein said ring means and said hub means each comprise upper and lower edge portions, said filament being wrapped partially around said ring means at a first plurality of locations around said ring, said filament passing from each of said locations to another said location and over a portion of said hub means in between said locations in a repetitive fashion forming a first plurality of spoke portions, each of said spoke portions contacting said upper edge of said ring means at one of said locations also contacting said upper edge of said ring means at another of said locations and said lower edge of said hub means therebetween, each of said spoke portions contacting said lower edge of said ring means at one of said locations also contacting said lower edge of said ring means at another of said locations and said upper edge of said hub means therebetween, said locations being spaced apart and sufficient in number so as to permit trapping of said hub means between said spokes.

20. An inertial energy storage rotor device in accordance with claim 19, wherein said hub means comprises a rigid cylinder having means for affixing to said shaft, a pair of annular flanges being disposed adjacent to but not coextensive with the upper and lower surface of said cylinder, said flanges being substantially parallel and extending about the diameter of said cylinder, the surface of said annular flanges adjacent to said upper and lower surfaces of said cylinder each being beveled uniformly at a preselected angle from the portions thereof adjacent to said cylinder to the portions thereof distal to said cylinder, said portions of said flanges adjacent to said cylinder being wider than said distal portions, each of said spoke portions of said first and second pluralities engaging an adjacent said annular portion upon passage between said locations, the angle of said spoke portions between the planes defined by said upper and lower edge portions of said ring means substantially coinciding with said preselected angle.

21. An inertial energy storage rotor device in accordance with claim 19, wherein said filament of said spoke means comprises an anisotropic material.

22. An inertial energy storage rotor device in accordance with claim 19, wherein said rim means comprises a filamentary winding about the circumference of said ring means, the material forming said filamentary winding having a higher Young's modulus than the material forming said single filament of said spoke means.

23. An inertial energy storage rotor device in accordance with claim 19, wherein said locations are equidistantly spaced around said ring means and are odd in number.

24. An inertial energy storage rotor device in accordance with claim 23, wherein the wrapping of said spoke filament around said ring means and the passing thereof over said hub means through each of said locations of said first plurality comprises a winding cycle, at the end of said winding cycle through each of said locations said filament is wrapped about said ring means and over said hub means in an alternate winding cycle having a second plurality of locations displaced symmetrically a fixed distance from said first plurality of locations, thereby forming a second plurality of spoke portions.

25. An inertial energy storage rotor device in accordance with claim 24, wherein during said mounting of said rim means to said hub means said spoke filament oscillates between said first winding cycle and said second winding cycle, completion of one of said winding cycles causing a shift to the other of said winding cycles as a result of said locations being odd in number.

26. An inertial energy storage rotor device in accordance with claim 25, wherein the portions of said spoke filament within said second winding cycles cross over portions of said spoke filament in said first winding cycles at the outer surface of said ring means and between adjacent locations of said first and second pluralities of locations.

27. An inertial energy storage rotor device for rotation about an axis defined by a shaft comprising:
   substantially rigid ring means;
   hub means for attachment to said shaft;
   spoke means for mounting said ring means to said hub means;
   rim means concentrically disposed about said ring means; and
   securing means comprising a plurality of radially disposed discrete helical stacked filamentary windings, said discrete helical stacked filamentary windings each being wound around said rim means and said ring means at preselected locations about the circumference thereof, said securing means being independent of said spoke means.

28. An inertial energy storage rotor device in accordance with claim 27, wherein said helical stack of filamentary windings of said securing means comprises an anisotropic material.

29. An inertial energy storage rotor device in accordance with claim 27, wherein said helical stacked filamentary windings of said securing means are each bonded to said rim means and said ring means by a suitable bonding agent.

30. An inertial energy storage rotor device in accordance with claim 27, wherein said discrete helical stacked filamentary windings of said securing means are disposed at locations about the circumference of said concentric ring means and rim means, said locations being equally spaced about said circumference.

31. An inertial energy storage rotor device in accordance with claim 30, wherein said spoke means contacts said ring means at a plurality of predetermined equally spaced locations, each of said locations of said discrete helical stacked filamentary windings being disposed equidistantly between said locations of contact between said spoke means and said ring means.

* * * * *